Oct. 20, 1970    J. J. MALESPINA ET AL    3,535,539
ALIGNMENT DEVICE
Filed April 11, 1968    4 Sheets-Sheet 1
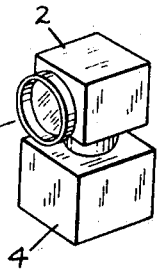
FIG.1.
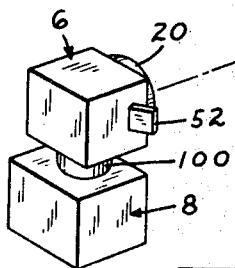
FIG.2.
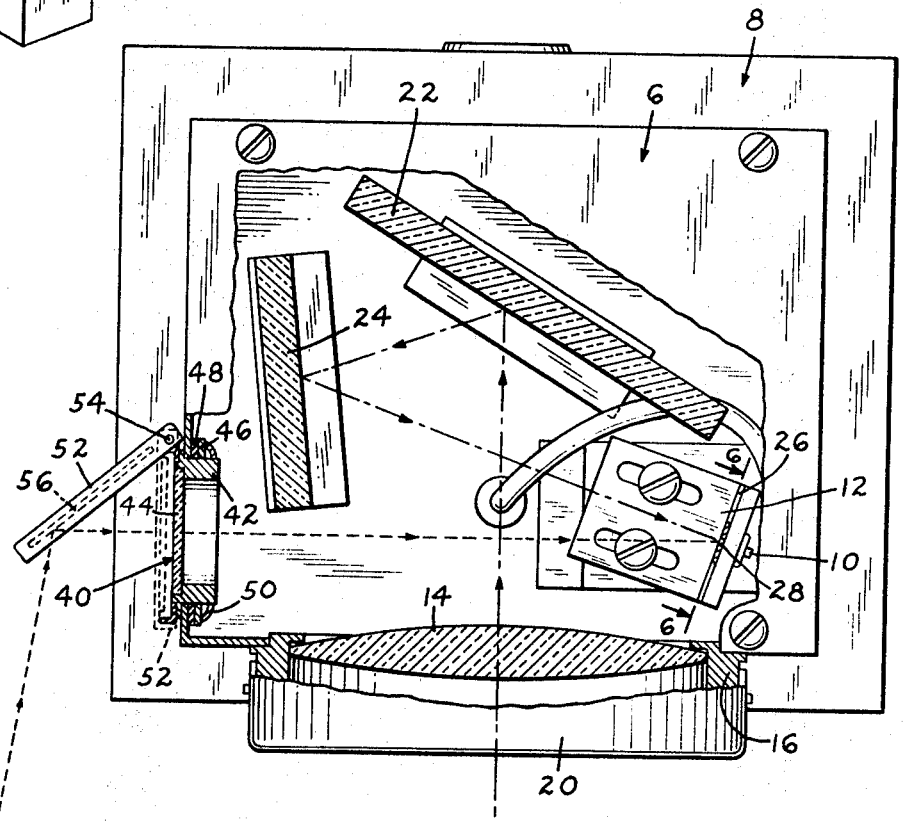
FIG.5.
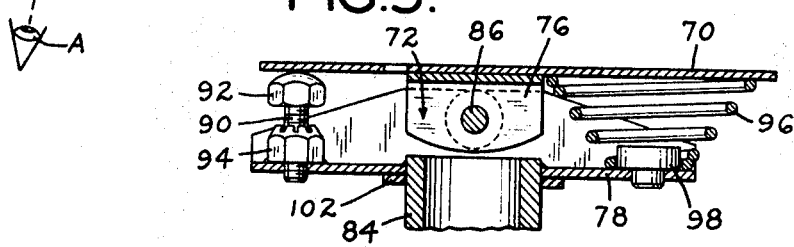

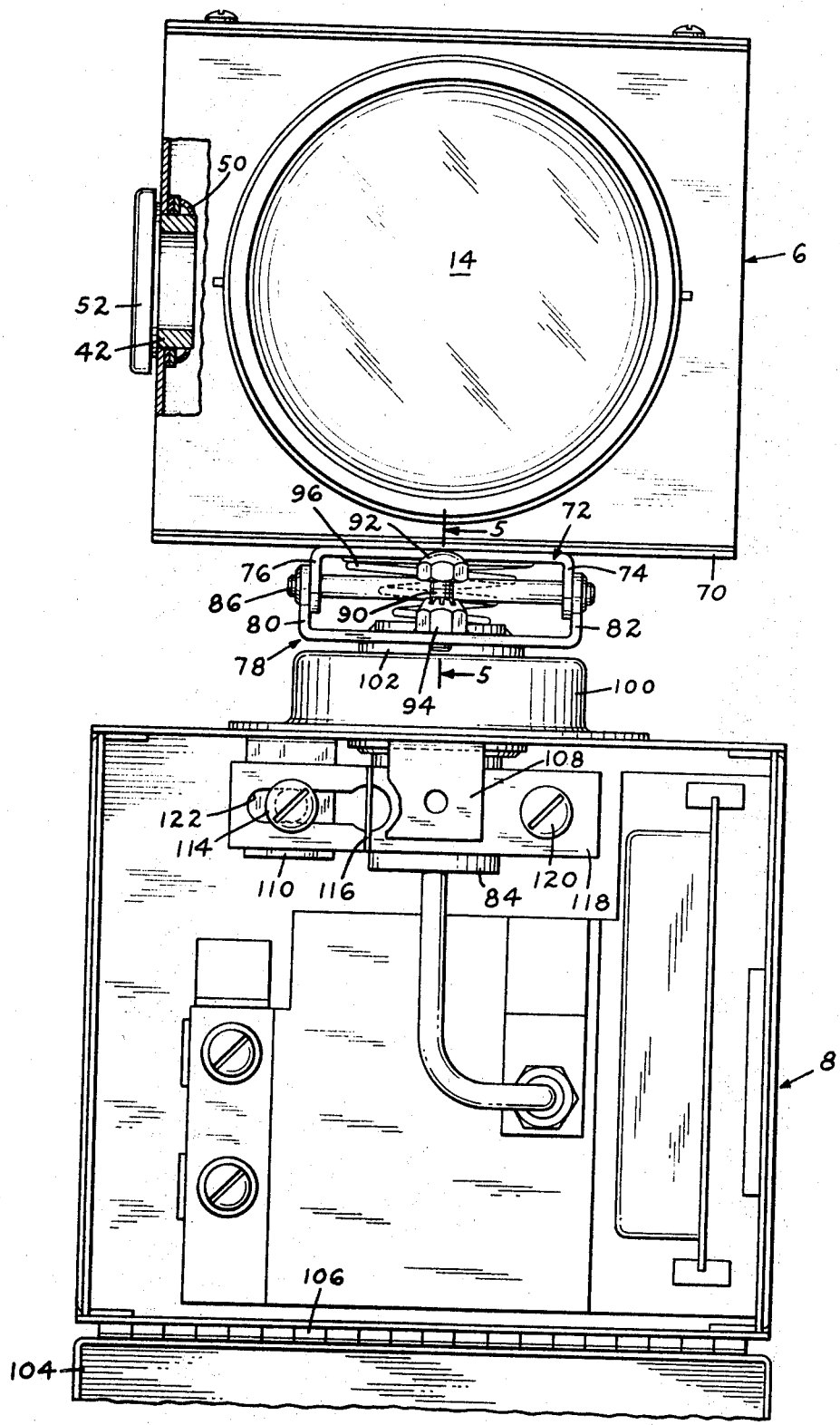

Oct. 20, 1970     J. J. MALESPINA ET AL     3,535,539

ALIGNMENT DEVICE

Filed April 11, 1968     4 Sheets-Sheet 4

United States Patent Office 3,535,539
Patented Oct. 20, 1970

3,535,539
ALIGNMENT DEVICE
Joseph J. Malespina, Waldwick, N.J., and Howard Pearson, New York, N.Y., assignors to American District Telegraph Company, Jersey City, N.J., a corporation of New Jersey
Filed Apr. 11, 1968, Ser. No. 720,566
Int. Cl. G02b 7/00
U.S. Cl. 250—239                               9 Claims

ABSTRACT OF THE DISCLOSURE

A light responsive detection system having a light source and a light responsive cell mounted in a housing spaced from the light source and for alignment therewith and including a cylinder, with a mirror, mounted on the cell housing for viewing the light beam image on the cell and an adjustable mounting for the housing for aligning the light beam image with the cell.

---

This invention relates to light responsive cells and to mountings for, and alignment of, such cells.

Light responsive detection systems, having a light source for projecting a beam to a light responsive cell mounted in a housing spaced from the light source, are used for a variety of purposes, such as, on conveyors, door opening devices, burglar alarms, fire alarms, smoke detectors, and a variety of other purposes. In such a system, the light responsive cell is usually mounted in a housing having a black or non-reflective interior and having a lens through which the light beam, directed from the light source to the lens, is focused on the cell. The cell is connected to electronic circuitry and, as the intensity of the light striking the cell increases, or decreases, as the case may be, because of the presence of the unit to be measured, detected, or whatever, in the path of the light beam between the cell and light source, the electronic circuitry is actuated to, in turn, actuate a control, motor, alarm, or the like. To shorten the length and size of the housing, in many such housings mirrors, to receive the light beam from the lens and to reflect the beam to the cell, are provided.

It is, of course, important in such cell arrangement that the light beam from the light source be directed to the cell and that the cell be in the proper position to receive the light beam. At the same time, it is also important that light from other sources, such as day-light, light from illumination, and light from sources other than the light beam source, not reach the cell because, if they do, actuation of the cell from the intended light source would be adversely affected. To prevent light from sources other than the intended light source, which other light source will, for convenience, be referred to as stray light, from reaching the cell, it is customary to encase the cell within the housing in a light-tight container and cover the front of the cell with a shield of non-light transmitting material which, usually at its center, is provided with a small opening through which the light beam from the intended source, focused by the lens and reflected by the mirrors, can reach the cell. Such a shield over the front of the cell does, of course, make the alignment of the cell with the light source more critical because, if not properly aligned, the cell will not receive the light beam and the system will then be inoperative. It is to the mounting and alignment of this type of cell to which the instant invention particularly relates.

In the past, in installing the light source and the cell, it has been the practice to visually align and mount the light source and the cell housings and, after connecting the cell to a meter, to further adjust the cell housing mounting until a prescribed reading is obtained on the meter. The meter would then be disconnected and removed. Because of the way in which cell housings have, heretofore, been mounted, adjusting the cell housing and locking the housing in its adjusted position, has been difficult. Furthermore, without reinstalling and reconnecting the meter, such cells could not be checked for proper alignment during operation. In addition, as for example, in a smoke detection system, the light source and cell are mounted at the ceiling. Walls, pipes, ducts, and the like, are in close proximity to the cell. The installation and adjustment of the cell is made from a ladder. Final adjustment of the cell in such an installation is even more difficult. Use of a meter to adjust the cell alignment from a ladder is also difficult.

The installation, adjustment and alignment of the light responsive cell of the instant invention overcomes many of the difficulties heretofore encountered. Means are provided for viewing the optical system in the cell housing and for simple adjustment of the housing to bring the focused light beam into alignment with the cell while the optical system is being observed. This is accomplished in the instant invention without the use of a meter or any other equipment other than a screwdriver and wrench.

In the instant invention, the housing in which the light sensitive cell is located is provided with an opening, closed when not in use, through which the front, or face, of the cell can be observed. For convenience and so that the cell housing can be adjusted from any position around the housing, there is a mirror for reflecting the image of the cell front, or face. The non-light transmitting shield over the front, or face, of the cell has, on its outwardly facing side, a series of circles, progressively enlarged in diameter and spaced concentrically around the opening to assist in the alignment of the cell.

The cell housing, of the instant invention, is mounted on the top of the cabinet containing the electronic circuitry by a post and platform. The post is clamped to the cabinet with a clamp and, by a simple screwdriver adjustment of the clamp, the alignment of the cell about the vertical axis of the post can be adjusted. The cell can also be adjusted about the horizontal axis by a simple adjustment of a bolt, in a bolt and spring assembly, carried on the mounting platform and in contact with the bottom of the housing. Thus, while observing the light beam image on the front of the shield over the light sensitive cell, the housing can be adjusted so that the light beam transmitted by the lens and reflected by the mirrors can be simply adjusted, with a screwdriver and wrench so that, when adjusted, the focused and reflected light beam strikes the cell. If, during operation, it is desired to check the alignment, the light beam striking the cell can be observed while the cell is in operation.

The invention will be better understood from the following description of the preferred embodiment and drawings, in which:

FIG. 1 is a view, in perspective, of the light source and cell of the instant invention;

FIG. 2 is a top plan view, partly in section, of the cell, optical system and cell housing of the instant invention;

FIG. 3 is an elevational view, partly in section, taken from the front of the cell housing;

Figure 4:
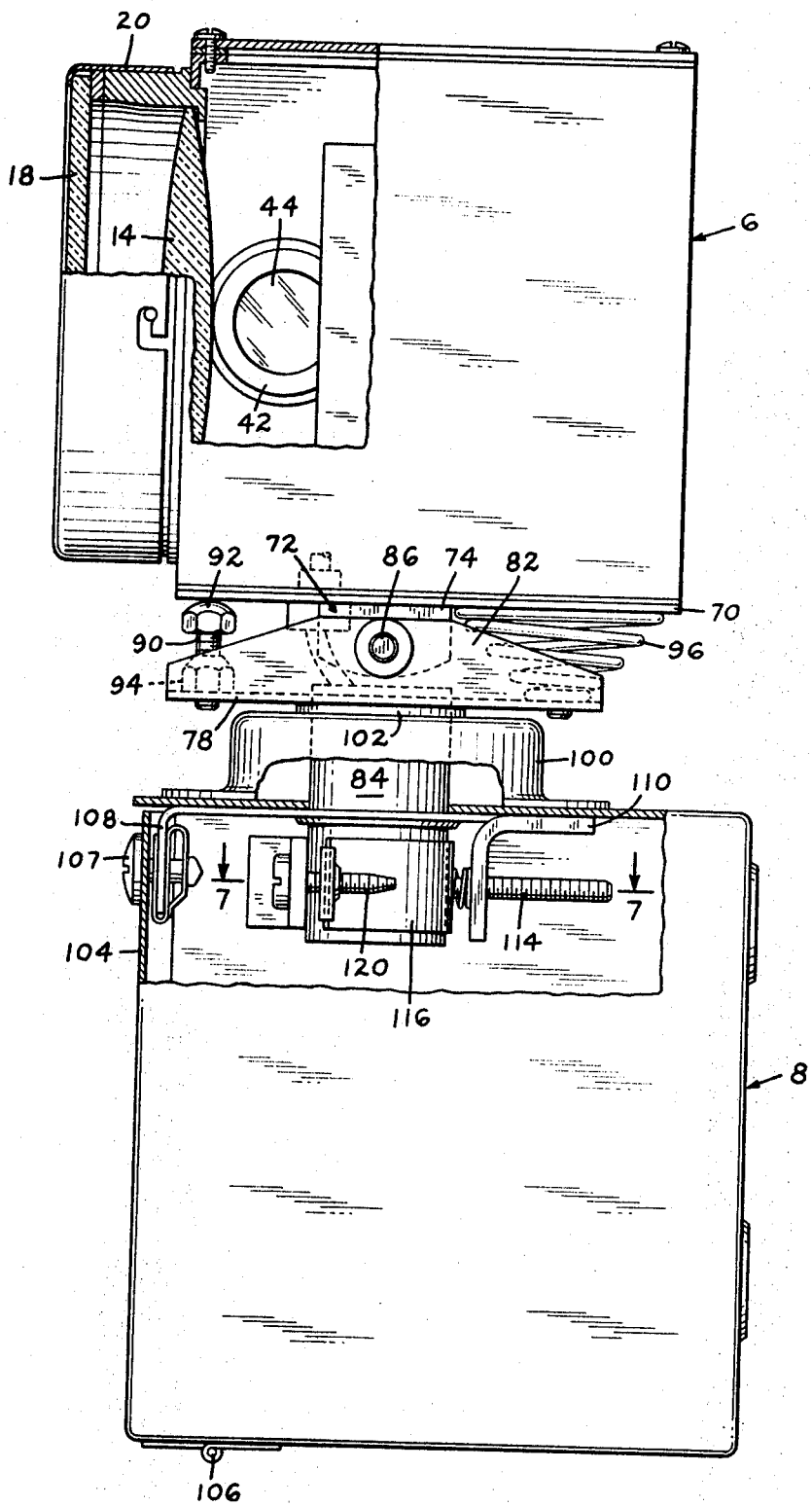
FIG. 4 is an elevational view, partly in section, taken from the side of the cell housing.
Figure 6:
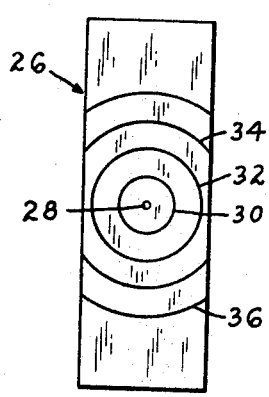
Figure 7:
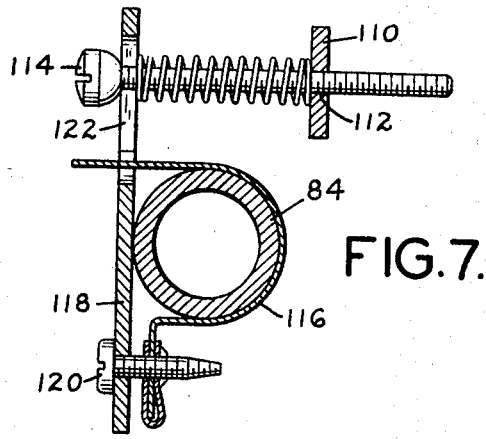
Figure 9:
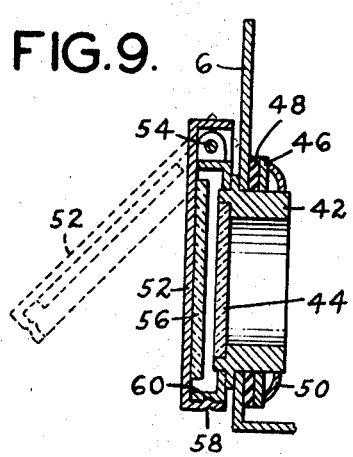
Figure 8:
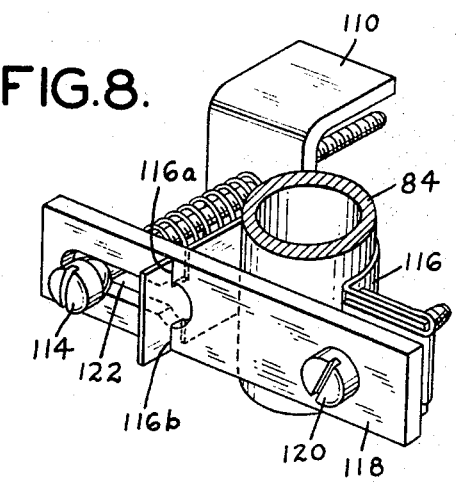
Figure 10:
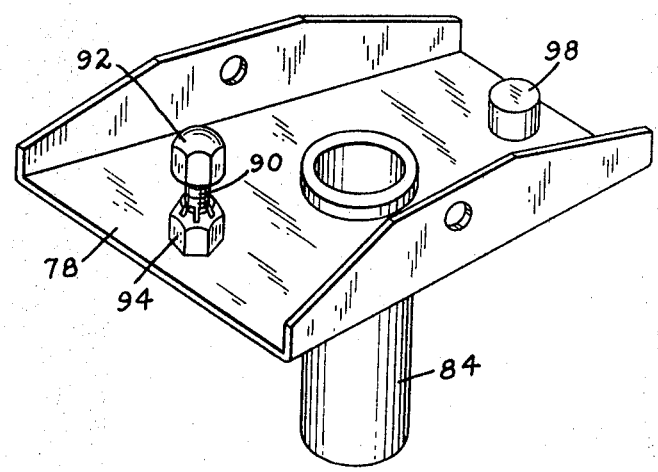

FIG. 5 is a view taken along line 5—5 of FIG. 3;
FIG. 6 is a view taken along line 6—6 of FIG. 2;
FIG. 7 is a view taken along line 7—7 of FIG. 4;
FIG. 8 is a perspective view of the clamp of FIG. 7;
FIG. 9 is a cross sectional view of the housing opening and cover in FIG. 1, showing the cover in a solid line closed and, in phantom line, open; and FIG. 10 is a perspective view of the mounting platform.

Referring to FIGS. 1 and 2, housing 2, containing a light source, not shown, is mounted on a cabinet 4 containing electronic circuitry for the light source and directs a beam of light in the direction of the arrow in FIG. 1 toward housing 6 mounted on cabinet 8. Light responsive cell 10 is mounted by bracket 12 in housing 6. At the front end of rousing 6, facing light source housing 2, lens 14, is mounted at the inner end of lens casing 16, the outer end of casing 16 having a glass, or filter 18 held in position by ring 20. Mirrors 22, 24 are mounted inside of housing 6 so that the light beam from lens 14 is reflected from mirror 22 to mirror 24 and then to light responsive cell 10. The length of travel of the light beam from lens 14 to mirrors 22, 24 and cell 10 corresponds, approximately, to the focal length of lens 14. Cell 10 is covered by shield 26 of a non-light transmitting material, such as a metal plate or foil. The center of shield 26 has an opening 28 passing through the shield to transmit light through the shield to cell 10 and the outwardly facing surface of shield 26 has concentric circles 30, 32, 34, 36 scribed on its surface, concentrically around hole 28 for purposes more obvious hereinafter.

The wall of housing 6 opposite cell 10 has a viewport, generally designated 40, made up of a cylindrical tube 42 closed at its outer end by a transparent pane 44 of glass, plastic, or similar material. Tube 42 is mounted in the wall of housing 6 by washer 46, gasket 48 and snap ring 50. For reasons explained later, tube 42 is rotatable in the wall of housing 6. Cover 52 is pivoted at 54 on tube 42 and, on its inner surface, cover 52 has a mirror 56. At its free end, FIG. 9, cover 52 has a detent 58 which, when the cover is closed, snaps into a recess 60 to hold cover 52 closed.

Referring now to FIGS. 3, 4, 5, 7, 8 and 10, cell housing 6 is mounted on cabinet 8 by plate 70 attached, as by, for example, spot welding, to the bottom of cabinet 6. Bracket 72 is affixed, as for example, by welding, to plate 70 and has extending downwardly from the opposite ends thereof, end walls 74, 76. Platform 78 having upwardly extending end walls 80, 82, is attached, such as by, for example, welding, to the end of shaft 84. Pin 86 extends through aligned openings in walls 74, 76, 80, 82, pivotally mounting cell housing 6 on platform 78 for reasons hereinafter explained. Bolt 90 is threaded, at one of its ends, in lock nut 94 which is affixed, as for example, by welding to platform 78 and head 92 of bolt 90 engages the bottom of plate 70 for purposes hereinafter described. Lock nut 94, threaded on the threads of bolt 90 locks bolt 90 in adjusted position in platform 78. Compression spring 96 engages, at one of its ends, plate 70 and, at its opposite end, platform 78 and is held in position on platform 78 by lug 98.

Referring particularly to FIGS. 4, 5, 7 and 8, shaft 84 extends downwardly through cover 100 affixed such as by, for example, welding to the upper side of cabinet 8, and the lower end of shaft 84 extends downwardly through the upper wall of cabinet 8 into the upper end of cabinet 8. Collar 102 on shaft 84 bears on the top of cover 100 spacing platform 78 and cover 100, permitting platform 78 to be rotated with respect to cabinet 8 and cover 100.

The front 104 of cabinet 8 is hinged at 106 so that the front of the cabinet can be opened, with a screwdriver, by turning button 107 in bracket 108 fastened to the upper wall of cabinet 8.

Adjustment bracket 110 is fixed, such as by, for example, welding, to the inside surface of the upper wall of cabinet 8 and has a threaded hole for receiving the threaded end of adjusting screw 114. Strap 116, fastened, at one of its ends to clamp plate 118 by lock screw 120 is slotted, at its opposite end at 116a and 116b and engages in longitudinal opening 122 in clamp plate 118. The head of screw 114 passes through longitudinal opening 122 in clamp plate 118.

Cell housing 6 is adjustable on cabinet 8 about a vertical and a horizontal axis. To adjust housing 6 about a horizontal axis, bolt 90 is turned to thread bolt 90 into or out of platform 78 and, as the height of bolt 92 is adjusted, compression spring 96 rotates housing 6 about pin 86 holding plate 70 in contact with the head of bolt 92.

To adjust housing 6 about its vertical axis, front 104 of cabinet 8 is opened, by a screwdriver by turning button 107, allowing cover 104 to hinge open on hinge 106. With cover 104 open, screw 120 is loosened, loosening strap 116, and housing 6 is turned by hand until it is in approximate alignment and screw 120 is again tightened, clamping strap 116 around shaft 84. Final adjustment of housing 6 is then made by turning screw 114 with a screwdriver either in a clockwise direction to rotate housing 6 in a clockwise direction about its vertical axis on cabinet 8 or turning screw 114 in a counter-clockwise direction which will rotate housing 6 in a counter-clockwise direction about its vertical axis on cabinet 8.

Light source housing 2 may be mounted on cabinet 4 for adjustment about a vertical and horizontal axis in the same manner as the mounting of cell housing 6 on cabinet 8 disclosed above, in a different manner, or housing 2 may be fixed to cabinet 4. In most installations, final alignment of the beam from the light source in housing 2 with the light sensitive cell in housing 6 can be accomplished by adjusting cell housing 6 on cabinet 8 and, in such installations, adjustment of light source housing 2 on cabinet 4 is not necessary. The light source in housing 2 has an optical axis which is not coaxial with the optical axis of the light responsive cell 10, where optical axis is defined as the line through the focus and vertex of the optical surface in question. Therefore, the light responsive cell 10 and the light source are not optically in line with respect to one another. The viewport 40 and the mirror 56 which is situated within cover 52, also have optical axes which are not coaxial with either the light responsive cell 10 or the light source. Therefore, the viewport 40 and the mirror 56 are not in line with either the light responsive cell 10 or the light source.

The alignment of the light source in housing 2 with the reflector therein, and the alignment of light responsive cell 10 in housing 6 with respect to mirrors 22, 24 and lens 14 is made, in the customary manner, at the time the units are assembled and before the units are shipped to the point where the light source and light responsive cell are to be installed. The alignment hereinafter described takes place after the units are installed and is only concerned with the alignment of the light responsive cell housing 6 with light source housing 2 so that the light beam, when received by lens 14 in light responsive cell housing 6, will strike light cell 10 through opening 28 in shield 26.

The light source unit, made up of light source housing 2 and cabinet 4, and the light cell unit, made up of light cell housing 6 and electronic cabinet 8, are mounted in spaced position on brackets, not shown, attached to cabinets 4, 8, respectively, with the lens of light source housing 2 and the lens of cell housing 6 facing each other in approximate alignment. This is done as the units are installed by line-of-sight. It is of course important, when installing the two units, that pipes, ducts, wires, and the like, are not in the light-of-sight between the two units. After the unit cabinets have been installed on the brackets and secured by line-of-sight which, for purposes of convenience, will hereinafter be referred to as "roughly aligned," the final alignment of the units to which the instant invention is related and which will now be described, is carried out.

For final alignment, cover 104 of cabinet 8 and cover 52 on cylindrical tube 42 are opened. Cylindrical tube 42 is rotated in housing 6 so that mirror 56 in cover 52 is at a convenient viewing position to the eye A (FIG. 2) of the installer installing and aligning the unit. Tube 42 is rotated and cover 52, with mirror 56, is adjusted so that the installer can see the front of shield 26 on cell 10 in mirror 56. The light source in light source housing 2 is turned on so that the beam from the light source is received by lens 14, focused, and reflected by mirrors 22, 24, to shield 26.

If housing 6 is in proper alignment, the focused beam, received from the light source, strikes light cell 10 through hole 28 in shield 26 and no adjustment of housing 6 is required. If, however, housing 6 is not in perfect alignment, the light beam image strikes shield 26 and, depending upon its relative location on shield 26 with respect to opening 28, as indicated by target lines 32, 34, 36, the installer can see what adjustment is required. To bring the light beam image into vertical alignment with opening 28, bolt 90 is turned, by a wrench applied to head 92, to raise or lower the front of cabinet 6, as required, to adjust the vertical position of the image on shield 26. The vertical adjustment is accomplished by pivoting the housing about its horizontal axis. To bring the image of the light beam striking shield 26 into horizontal alignment with opening 28, screw 114 is turned clockwise, or counter-clockwise, as the case may be, to bring the image into horizontal alignment. The horizontal alignment of the housing is accomplished by pivoting the housing about its vertical axis. When properly adjusted in both the horizontal and vertical position, by pivoting the box about its vertical and horizontal axes, respectively the light beam image strikes shield 26 at hole 28, and the beam passes through hole 28 to light responsive cell 10. Housing 6 is then in proper adjusted alignment and cover 52 is then closed, snapping detent 58 snaps into recess 60 to hold cover 52 closed.

Housing 6 can be aligned either with cell 10 active or inactive. Once aligned, and if not already activated by the electronic circuitry in cabinet 8, the electronic circuitry can be turned on. During operation, of course, and after housing 6 has been aligned, cabinet front 104 is closed.

Usually, during operation, realignment of housing 6 is not required. However, if during operation, it should be desired to check the alignment of cell housing 6, cover 52 can be opened, and the face of shield 26 can be viewed while the cell is in operation.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. Alignment apparatus for a light responsive detection system having a light responsive cell, a light source for transmitting a beam of light to the light responsive cell, said light responsive cell spaced from said light source for receiving said beam of light from said light source, a housing for said light responsive cell, optical means in said housing for receiving said beam of light from said light source and for focusing said beam on said cell, means affixed to said housing having an optical axis which is distinct from the optical axis of the light source for viewing the image of said beam on said cell and means for adjusting said housing about a vertical axis and a horizontal axis for changing the position of said light beam image on said cell.

2. Alignment apparatus for a light responsive detection system as recited in claim 1 in which said viewing means includes a cylindrical tube open at its end in said housing and closed at its outer end by a cover hinged to said tube.

3. Alignment apparatus for a light responsive detection system as recited in claim 2 in which said cover has a mirror on its inner surface for reflecting the image of said cell.

4. Alignment apparatus for a light responsive detection system as recited in claim 3, in which said cylindrical tube is mounted for rotation about its axis in said housing.

5. Alignment apparatus for a light responsive detection system as recited in claim 1 in which said means for adjusting said housing includes a plate fixed to said housing, a platform spaced from said plate, means for pivotally mounting said plate on said platform, spring means at one side of said pivotally mounting means for urging said plate and said platform away from each other at said one side of said pivotally mounting means and toward each other at the other side of said pivotally mounting means, adjustment means at said other side of pivotally mounting means for limiting the movement of said plate and said platform toward each other, a shaft fixed at one of its ends to said platform and extending downwardly from said platform and clamp means on said shaft for adjusting said shaft, said platform, said plate and said housing about the axis of said shaft.

6. Alignment apparatus for a light responsive detection system as recited in claim 5 in which said clamp means includes a strap connected at one of its ends to a clamp plate and fastened at its opposite end to said clamp plate by a screw, a bracket and means for connecting said clamp plate to said bracket.

7. Alignment apparatus for a light responsive detection system as recited in claim 6 in which said means for connecting said clamp plate to said bracket is a screw, said screw being adjustable in said bracket for turning said shaft about the axis of said shaft.

8. Alignment apparatus for a light responsive detection system as recited in claim 7 in which said shaft is mounted for rotation about its axis on a cabinet and said bracket is fixed to said cabinet.

9. Alignment apparatus for a light responsive detection system having a light source for transmitting a beam of light to a light responsive cell and a light responsive cell spaced from said light source for receiving said beam of light from said light source, a housing for said cell, optical means including a lens in the front wall of said housing for receiving said beam of light from said light source and for focusing said beam on said cell, a cylindrical tube mounted for rotation about its axis in the said wall of said housing for viewing the image of said beam on said cell, said tube having an optical axis distinct from the optical axis of the light source and being open at its end in said housing and closed at its outer end by a cover hinged to said tube, a mirror on the inner surface of said cover for reflecting the image of said cell, and means for adjusting said cell having about a vertical axis and a horizontal axis for changing the position of said light beam image on said cell, said adjusting means including a plate fixed to said housing, a platform spaced from said plate, means for pivotally mounting said plate on said platform, spring means at one side to said pivotally mounting means for urging said plate and said platform away from each other at said one side of said pivotally mounted means and towards each other at the other side of said pivotally mounted means, adjustment means at said other side of said pivotally mounted means for limiting the movement of said plate and said platform toward each other, a cabinet, a shaft fixed at one of its ends to said platform and extending downwardly from said platform into said cabinet, means on said cabinet and said shaft for supporting said shaft, said platform, said plate and said cell housing on said cabinet for rotation about the axis of said shaft and clamp means on said shaft for adjusting said shaft on said cabinet about the axis of said shaft, said clamp means including a strap connected at one of its ends to a clamp plate and fastened at its opposite end to said clamp plate by a screw, a bracket fixed to said cabinet and screw means connecting one end of said clamp plate to said bracket, said screw means being adjustable in said bracket for turning said shaft on said cabinet around the axis of said shaft.

References Cited

UNITED STATES PATENTS 2,491,192  12/1949  Martin et al. _____ 250—239 X
2,918,585  12/1959  Farmer _____ 250—239

RAYMOND F. HOSSFELD, Primary Examiner

U.S. Cl. X.R.

356—219

D-1193

FO-1050
(5/69)

UNITED STATES PATENT OFFICE
CERTIFICATE OF CORRECTION

Patent No. 3,535,539        Dated 10/20/70

Inventor(s) Malespina et al.

It is certified that error appears in the above-identified patent and that said Letters Patent are hereby corrected as shown below:

Col. 3, line 25, "rousing" should read -- housing --;

col. 6, line 66, "having" should read -- housing --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents